(12) United States Patent
Küsters et al.

(10) Patent No.: US 6,601,654 B2
(45) Date of Patent: Aug. 5, 2003

(54) COUPLING DEVICE

(75) Inventors: Hubertus Küsters, Harsewinkel (DE); Joachim Oldenburg, Uedem (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/923,514

(22) Filed: Aug. 7, 2001

(65) Prior Publication Data

US 2002/0043379 A1 Apr. 18, 2002

(30) Foreign Application Priority Data

Aug. 17, 2000 (DE) .......................... 100 40 741

(51) Int. Cl.⁷ .......................... A01B 59/043; F16B 7/06
(52) U.S. Cl. .......................... 172/439; 403/43; 403/235
(58) Field of Search .................. 172/439, 444, 172/445, 445.1, 445.2, 446, 677, 679; 403/43, 44, 45, 46, 47, 48, 220, 285, 226, 227, 228

(56) References Cited

U.S. PATENT DOCUMENTS

| | | | |
|---|---|---|---|
| 2,712,742 A | | 7/1955 | Neidhart |
| 3,432,184 A | * | 3/1969 | Tweedy ...................... 172/272 |
| 3,837,753 A | * | 9/1974 | Weiste et al. ............... 172/439 |
| 4,667,530 A | * | 5/1987 | Mettler et al. .............. 403/225 |
| 5,076,369 A | * | 12/1991 | Herchenbach .............. 172/439 |
| 5,092,409 A | | 3/1992 | Defrancq |
| 5,697,454 A | * | 12/1997 | Wilcox et al. ............... 172/439 |
| 5,997,024 A | | 12/1999 | Cowley |
| 6,056,069 A | * | 5/2000 | Hagen et al. ............... 172/679 |
| 6,138,447 A | * | 10/2000 | Stivers et al. ................ 56/128 |
| 6,149,180 A | * | 11/2000 | Haws .......................... 172/439 |

FOREIGN PATENT DOCUMENTS

| | | | |
|---|---|---|---|
| DE | 196 37 547 | 3/1998 | |
| EP | 0 948 882 | 10/1999 | |
| GB | 710244 | * 6/1954 | ............... 403/220 |
| GB | 2094393 | * 9/1982 | ............... 403/220 |

OTHER PUBLICATIONS

Robert Iredell, "Elastic Rubber Cushion Springs", Product Engineering, pp. 119–123, Mar. 1952.*

* cited by examiner

Primary Examiner—Thomas B. Will
Assistant Examiner—Nathan Mammen
(74) Attorney, Agent, or Firm—Husch & Eppenberger, LLC; Robert E. Muir; David A. Chambers

(57) ABSTRACT

A coupling device for mounting an agricultural implement on a tractor equipped with a belt drive, which includes two coupling halves which are connected to each other by several coupling rods, designed in such a way that no components working on the linear drive principle are needed. The lower right and left coupling rods include in each case a lower front and a lower rear rod section which are connected to each other, and which are freely movable relative to each other. One end of the lower rear rod section carries an expanded portion, which is located inside a housing of the end region of the lower front rod section. A plurality of elastically deformable equalizing bodies are inserted between the inner surfaces of the housing of the end region and the outer surfaces of the expanded portion, limiting the movement of the lower rear rod section in relation to the lower front rod section.

12 Claims, 2 Drawing Sheets

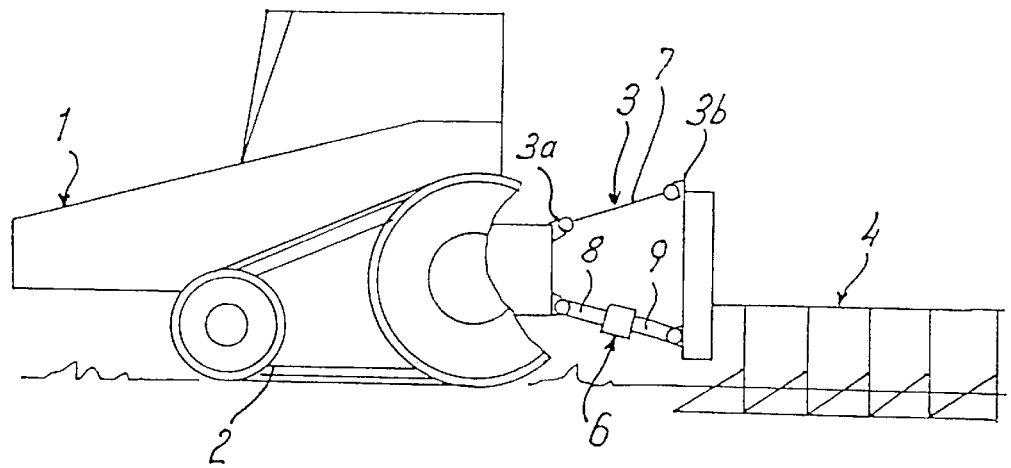
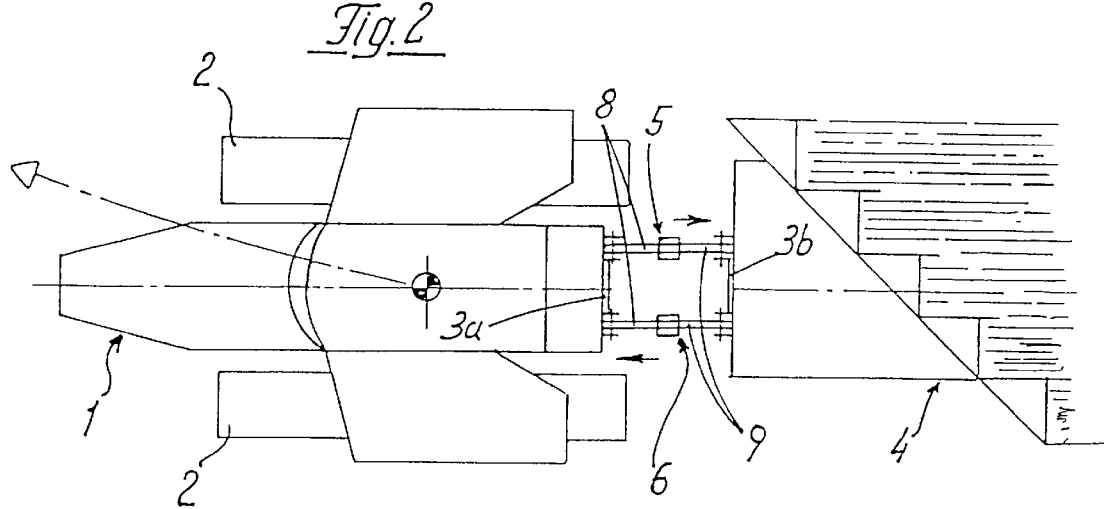

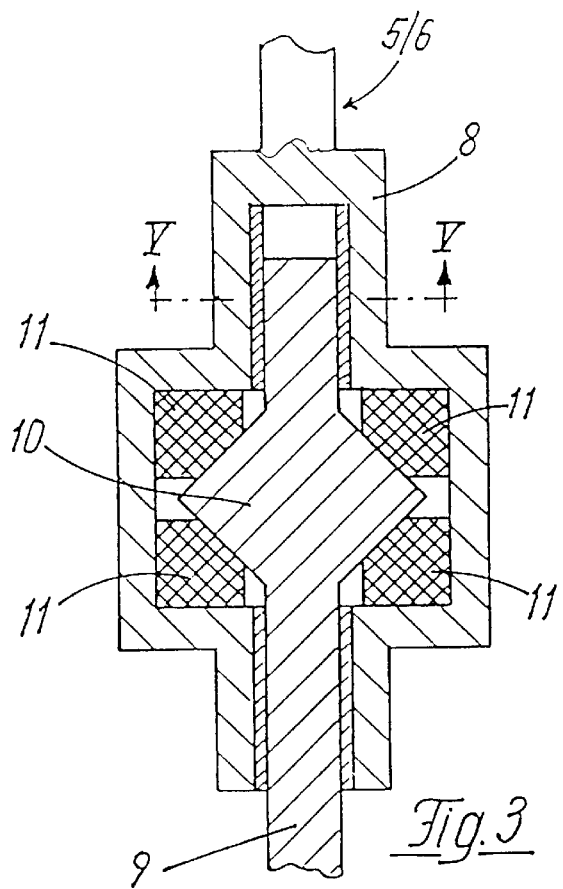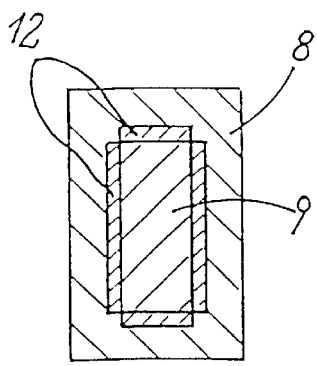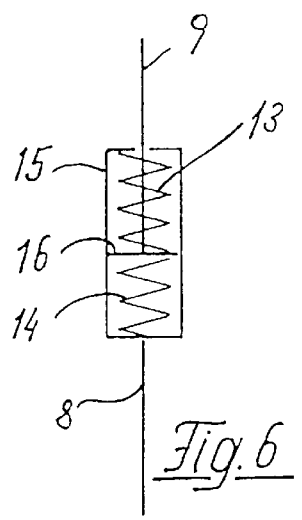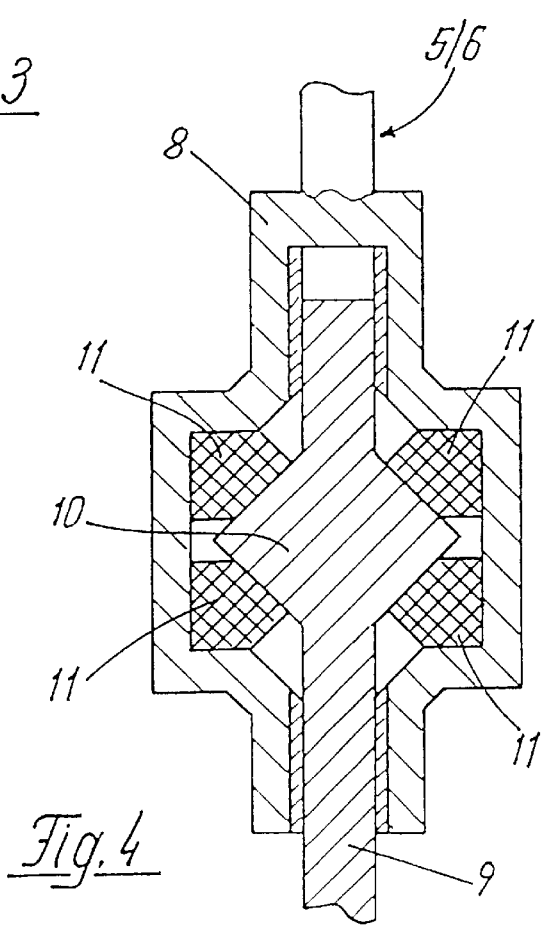

COUPLING DEVICE

BACKGROUND OF THE INVENTION

The present invention relates generally to a coupling device for mounting an implement on a tractor, which is preferably equipped with a belt drive. The coupling device includes coupling halves mounted on the implement side and tractor side. The coupling halves are movably connected to each other by several coupling rods.

The coupling device is sometimes referred to as a three-point linkage, which may comply with relevant standards. The coupling device usually includes two lower rods of the same height above the ground and an upper link arranged centrally thereabove. These coupling devices are designed for tractors with at least two driven wheels. Tractors of this kind have a relatively large turning radius due to the steering geometry of the axles. The coupling device makes it possible for the implement to be adjusted, or moved, laterally to a small extent in relation to the tractor. The need for adjustment is particularly necessary in the case of mounted machines or implements for soil cultivation. By means of the coupling device, cornering is possible to a limited extent for vehicles with a large turning radius, without overloading the elements of the coupling device when the mounted implement is in the lowered working position, for example, for soil cultivation.

Belt driven tractors, whose turning radius are clearly lower than those of tractors with steerable wheels, are being used to an increased extent because of their lower pressure load on the soil. Known coupling devices can be used only to a limited extent with belt-driven tractors because this type of tractor requires more lateral adjustment than known coupling devices can provide.

Cowley, European Patent No. 0 948 882 A1, discloses a coupling device which enables a steering function so that lateral forces transmitted to the tractor are reduced. For this purpose, the coupling device includes a rigid, central coupling rod about which are arranged three coupling rods, describing a triangle, which are adjustable in length. These coupling rods consist of hydraulic cylinders which on account of the central coupling rod must take up only relatively small forces. The piston rods of the hydraulic cylinder must be retracted and extended to change their length, which requires the hydraulic cylinders be controlled. This type of adjustment is however technically elaborate. It is therefore further proposed to use other coupling rods, which work on the linear drive principle, for example pneumatic actuators or recirculating-ball spindle actuators. The two mentioned examples are not normally considered for use in the agricultural sphere, because it would be necessary to furnish the tractors with a corresponding pneumatic or electrical system for these devices.

Defrancq, U.S. Pat. No. 5,092,409, describes a coupling device for front mounting of an implement. The connecting elements or coupling rods likewise consist of hydraulic cylinders, so that elaborate control is necessary.

Finally, Hune, German Patent No. 196 37 547 A1, discloses that the coupling halves can be connected by two pendulum supports in a V relative to each other. This solution is also technically elaborate, as it is necessary to adjust the pendulum supports by means of a motor-driven device in order for return to take place. A coupling device of this kind is not suitable for an agricultural implement because it is integrated in the power flux of a manipulator arm, so that one coupling half is attached to the manipulator arm, while the other coupling half for example carries a tool.

The present invention is directed to overcoming one or more of the problems set forth above.

SUMMARY OF THE INVENTION

An aspect of the invention is to provide a coupling device for connecting an implement to a tractor.

In another aspect of the invention there is provided a coupling device for connecting an implement to a tractor, wherein the coupling device has purely mechanical function.

In another aspect of the invention there is provided a mechanical coupling device for connecting an implement to a tractor, wherein the coupling device has a lower left and a lower right coupling rod, wherein each coupling rod has a lower front and a lower rear rod section, whereby the lower front rod section and the lower rear rod section are interlocked by resilient elements.

Yet another aspect of the invention is to provide a method for use of a coupling device for maintaining a mechanical connection between a tractor and an implement.

The above aspects are merely illustrative and should not be construed as all-inclusive. The aspects should not be construed as limiting the scope of the invention, rather the scope of the invention is detailed in the appended claims.

BRIEF DESCRIPTION OF THE DRAWINGS

Reference is now made to the drawings, which illustrate the best known mode of carrying out the invention and wherein the same reference characters indicate the same or similar parts throughout the views.

FIG. 1 is a tractor and an implement coupled thereto by means of the coupling device according to the invention in a side view;

FIG. 2 is a top view corresponding to FIG. 1, purely schematically;

FIG. 3 is the connection of the two rod sections of a coupling rod in a horizontal section, in a first embodiment;

FIG. 4 is the connection of the two rod sections of a coupling rod in a horizontal section, in a second embodiment;

FIG. 5 is a section along the line V—V in FIG. 3; and

FIG. 6 is the connection of the two rod sections of a coupling rod in a further embodiment, purely schematically.

DETAILED DESCRIPTION

FIGS. 1 and 2 show purely schematically a tractor 1, having a front, a rear, a left, and a right, equipped with a belt drive 2. In the preferred embodiment shown, an implement 4 is coupled to the rear side of the tractor 1 through the use of a coupling device 3. The coupling device 3 has no components working on the linear drive principle, no control systems, nor motivation supplied by the tractor 1. The coupling device 3 is of simple mechanical design with a function to take up the pressure peaks when the tractor 1 changes direction, either vertically or horizontally. In the embodiment shown, the implement 4 is a soil cultivating implement in the form of a plow. The coupling device 3 has an at least one coupling half 3a and an at least one coupling half 3b. The coupling device 3 has an at least one lower right coupling rod 5 and an at least one lower left coupling rod 6. The at least one coupling half 3a and the at least one coupling half 3b are connected to each other by the at least one lower right coupling rod 5, the at least one lower left coupling rod 6, and an at least one upper coupling rod 7, which is arranged centrally above. The at least one lower right coupling rod 5, the at least one lower left coupling rod 6, and the at least one upper coupling rod 7 cooperate and form the coupling device 3, which is referred to in the art as a three-point linkage of a hydraulic jack unit.

FIGS. 1 and 2 show that the at least one lower right coupling rod 5 and the at least one lower left coupling rod 6 each have one of a plurality of lower front rod section 8 and one of a plurality of lower rear rod section 9. The plurality of lower front rod section 8 and the plurality of lower rear rod section 9 have a front and a rear, with the front being oriented nearest to the rear of the tractor 1. The plurality of lower front rod section 8 and the plurality of lower rear rod section 9 are movably connected to each other. According to the present invention, a connection of one of the plurality of lower front rod section 8 and one of the plurality of lower rear rod section 9 form one of the at least one lower right coupling rod 5 or one of the at least one lower left coupling rod 6, providing an exclusively mechanical connection, where no hydraulic or electrical components requiring energy, in any form, are necessary. Therefore, the coupling device 3 is extremely cheap to make, not dependent upon the tractor 1, and, furthermore, not susceptible to breakdowns. When one of the plurality of lower front rod section 8 or one of the plurality of lower rear rod section 9 is subjected to compressive or tensile loading, there is an undetermined movement of one of the plurality of lower front rod section 8 or one of the plurality of lower rear rod section 9 relative to each other. While the plurality of lower front rod section 8 is shown connected to the at least one coupling half 3a and the plurality of lower rear rod section 9 is shown connected to the at least one coupling half 3b, it is understood the positions and associations of the plurality of lower front rod section 8 and the plurality of lower rear rod section 9 with the at least one coupling half 3a and the at least one coupling half 3b may be reversed.

The rear region of the plurality of lower front rod section 8 is constructed to provide a housing in which the front region of the plurality of lower rear rod section 9 engages or is inserted. Referring now to FIGS. 3 and 4, the embodiments show the plurality of lower front rod section 8 and the plurality of lower rear rod section 9 can move freely relative to each other exclusively in the longitudinal direction, as the plurality of lower rear rod section 9 is inserted in the housing of the rear region of the plurality of lower front rod section 8. Referring to FIG. 5, a plurality of bearing plate 12, preferably made of a plain bearing material, is arranged between the facing surfaces of the plurality of lower front rod section 8 and the plurality of lower rear rod section 9 for better guiding.

Referring to FIGS. 3 and 4, near the end of the front region of the plurality of lower rear rod section 9, there is an expanded portion 10 of basically square cross-section, so that triangular regions protrude relative to the two side surfaces of the plurality of lower rear rod section 9. The expanded portion 10 is polygonal, preferably quadrangular in horizontal section, the outer surfaces of the expanded portion 10 being at an obtuse angle to the adjoining regions of the plurality of lower rear rod section 9. The cross-section of the expanded portion 10 is then preferably square in horizontal section or triangles are attached to the end region of one of the plurality of lower rear rod section 9 on both sides. Due to the slope of the protruding surfaces, the mobility of the plurality of lower front rod section 8 and the plurality of lower rear rod section 9 is increased. In the preferred embodiment shown in FIGS. 3 and 4, the expanded portion 10 and the plurality of lower rear rod section 9 are constructed in one piece. However, corresponding profiles could also be rigidly attached to the two side surfaces of the plurality of lower rear rod section 9, for example, by welding.

In the corner regions of the housing of the rear region of the plurality of lower front rod section 8, elastically deformable equalizing bodies 11, which contact the associated outer surfaces of the expanded portion 10, are inserted. The elastically deformable equalizing bodies 11 are inserted to provide the at least one lower right coupling rod 5 and the at least one lower left coupling rod 6 with constant length during normal running. The elastically deformable equalizing bodies 11 interlock the plurality of lower front rod section 8 with the plurality of lower rear rod section 9, resulting in a connection without play. To transmit the forces, it is appropriate if the elastically deformable equalizing bodies 11 are solid and made of rubber or a rubber-like synthetic material. Other suitable materials could, however, be used for the elastically deformable equalizing bodies 11. If occasion arises, reinforcing portions could also be embedded in the elastically deformable equalizing bodies 11. The shaping of the equalizing bodies 11 is determined by the design of the cross-section of the plurality of lower front rod section 8 and the plurality of lower rear rod section 9. In the preferred embodiment, the inner surfaces of the elastically deformable equalizing bodies 11 facing towards each other are beveled according to the outer contour of the expanded portion 10. Due to a design of this kind, a connection is obtained in which the elastically deformable equalizing bodies 11 serve to transmit the forces but also allow free movement of the plurality of lower front rod section 8 and the plurality of lower rear rod section 9.

In the embodiments according to FIGS. 3 and 4, the contact surfaces between the expanded portion 10 and the elastically deformable equalizing bodies 11 are preferably at an angle of 135 degrees to the side surfaces of the plurality of lower rear rod section 9. Other shapes are conceivable, but form-locking must be ensured between the end regions of the plurality of lower front rod section 8 and the plurality of lower rear rod section 9 by the elastically deformable equalizing bodies 11. To assemble the plurality of the lower front rod section 8 and the plurality of lower rear rod section 9 it is appropriate if the housing of the end region of the plurality of lower front rod section 8 is in at least two portions. These two portions could then be screwed together with fasteners (not shown) after insertion of the elastically deformable equalizing bodies 11.

Referring now to the embodiment shown FIG. 4, the corners of the housing of the rear region of the plurality of lower front rod section 8 that face towards the plurality of lower rear rod section 9, are cut free so that elastic deformation of the elastically deformable equalizing bodies 11 is favored. The corresponding face for each of the elastically deformable equalizing bodies 11 is also beveled. Beveling the housing of the rear region of the plurality of lower front rod section 8 and the elastically deformable equalizing bodies 11 prevents the equalizing bodies from being so greatly deformed that damage occurs.

In the preferred embodiment, the at least one upper coupling rod 7 is a metal plate that provides a rigid connection between the at least one coupling half 3a and the at least one coupling half 3b. However, the at least one upper coupling rod 7 may be of wire rope. In another embodiment, the at least one upper coupling rod 7 may have the same components as the at least one lower right coupling rod 5, providing a flexible connection which can still transmit forces.

FIG. 6 shows another embodiment of the present invention. FIG. 6 shows the use of spring elements as equalizing elements. Two coaxial spring elements 13, 14 would be arranged in a housing, wherein attached to one rod section is a plate which is located between the two spring elements. These two coaxial spring elements 13, 14 are inserted in a housing 15 which in the embodiment shown is rigidly connected to the plurality of lower front rod section 8. The plurality of lower rear rod section 9 engages in the housing 15 and carries at its associated end a plate 16. The two coil springs 13, 14 are located on both sides of the plate 16, so that the plurality of lower rear rod section 9 can slide in both directions relative to the plurality of lower front rod section 8. In this embodiment, tilting of the plurality of lower front rod section 8 and the plurality of lower rear rod section 9, relative to each other, is possible. The plate 16 is preferably constructed in one piece with the end region of the plurality of lower rear rod section 9. While a plate 16 is shown, in another embodiment this element may have a profile. The corresponding profiles would be rigidly connected to the plurality of lower rear rod section 9.

In operation, the at least one coupling half 3a is operatively connected to the tractor and the at least one coupling half 3b is operatively connected to the implement. The at least one lower right coupling rod 5 and the at least one lower left coupling rod 6 are operatively connected to each other through one of the plurality of lower front rod section 8 and one of the plurality of lower rear rod section 9. One end of the at least one lower right coupling rod 5 is operatively connected to the at least one coupling half 3a, and the other end is operatively connected to the at least one coupling half 3b. One end of the at least one lower left coupling rod 6 is operatively connected to the at least one coupling half 3a, and the other end is operatively connected to the at least one coupling half 3b. Finally, one end of the at least one upper coupling rod 7 is operatively connected to the at least one coupling half 3a, and the other end is operatively connected to the at least one coupling half 3b. The components as operatively connected provide the coupling device 3, which connects the tractor to the implement for working use.

The invention is not confined to the embodiments shown. It is important that the at least one lower right coupling rod 5 and the at least one lower left coupling rod 6 of the coupling device 3 each have one of the plurality of lower front rod section 8 and one of the plurality of lower rear rod section 9, wherein the plurality of lower front rod section 8 and the plurality of lower rear rod section 9 are connected to each other in form-locking relationship. The plurality of lower front rod section 8 and the plurality of lower rear rod section 9 move relative to each other by means of resilient elastically deformable equalizing bodies 11.

What is claimed is:

1. A coupling device for mounting an implement on a tractor comprising:

a plurality of coupling halves mounted on the implement and the tractor which are movably connected to each other by a plurality of coupling rods each having a length, a lower front coupling rod section and a lower rear coupling rod section, one of the coupling rod sections including a housing defining a connecting region, the other coupling rod section including an expanded portion located within the housing, the expanded portion being polygonally shaped and outer surfaces of the expanded portion being at an obtuse angle to side surfaces of housing, resilient inter-locking means for resiliently controlling an amount of displacement of the lower rear rod section in relation to the lower front rod section, and the connecting region having a space between the lower front rod section and the lower rear rod section so that the lower front rod section and the lower rear rod section are longitudinally movable relative to each other in the connecting region thereby altering the length of the coupling rod upon application of force to at least one of the coupling rod sections.

2. A coupling device for mounting an implement on a tractor comprising:

a plurality of coupling halves mounted on the implement and the tractor which are movably connected to each other by a plurality of coupling rods each having a length, a lower front coupling rod section and a lower rear coupling rod section, one of the coupling rod sections including a housing defining a connecting region, the other coupling rod section including an expanded portion located within the housing, resilient means for controlling an amount of displacement of the lower rear rod section in relation to the lower front rod section, and the connecting region having a space between the lower front rod section and the lower rear rod section so that the lower front rod section and the lower rear rod section are longitudinally movable relative to each other in the connecting region thereby altering the length of the coupling rod upon application of force to at least one of the coupling rod sections, and wherein the resilient means includes a plurality of equalizing bodies, which are inserted in corner regions of the housing.

3. The coupling device according to claim 2, wherein the plurality of equalizing bodies are made of solid, rubber material.

4. The coupling device according to claim 2, further including a plurality of guide plates located in between a contact surface of the lower front rod section and the lower rear rod section.

5. The coupling device according to claim 2, wherein corners of the housing of the connecting region of the lower front section that face toward the expanded portion of the lower rear rod section are beveled.

6. The coupling device according to claim 5, wherein corners of the plurality of equalizing bodies are beveled and face away from contact surfaces between the plurality of equalizing bodies and the expanded portion of the lower rear rod section.

7. The coupling device according to claims 6, further including a plurality of guide plates located between a contact surface of the lower front rod section and the lower rear rod section.

8. A coupling device, for mounting an implement on a tractor comprising:

a plurality of coupling halves mounted on the implement and the tractor which are movably connected to each other by a plurality of coupling rods, wherein the plurality of coupling rods each having a length, a lower front coupling rod section, a lower rear coupling rod section, and a connecting region between the lower front rod section and the lower rear rod section so that the lower front rod section and the lower rear rod section are movable relative to each other in the connecting region thereby altering the length of the coupling rod upon application of force to at least one of the coupling rod sections;

resilient means for controlling an amount of displacement of the lower rear rod section in relation to the lower front rod section;

an expanded portion located in the connecting region of the lower rear rod section, the lower front rod section including a housing, having a space, in the connecting region;

the expanded portion including a profile, which extends across a cross-section of the housing of the connecting region for the lower front rod section and the resilient means including a plurality of coil springs, wherein the coil springs are located on each side of the profile.

9. The coupling device according to claim 2, further including a plurality of guide plates located between a contact surface of the lower front rod section and the lower rear rod section.

10. The coupling device according to claim 8, wherein the profile includes a flat, square plate.

11. The coupling device according to claim 8, wherein one coil spring is located on each side of the profile.

12. The coupling device according to claim 9, wherein the profile includes a flat, square plate and at least one coil spring is located on each side of the flat, square plate.

* * * * *